M. J. MALLOY.
IMPLEMENT FOR CORRUGATING PLASTIC STREET COVERINGS.
APPLICATION FILED FEB. 14, 1911.
993,086.
Patented May 23, 1911.
2 SHEETS—SHEET 1.
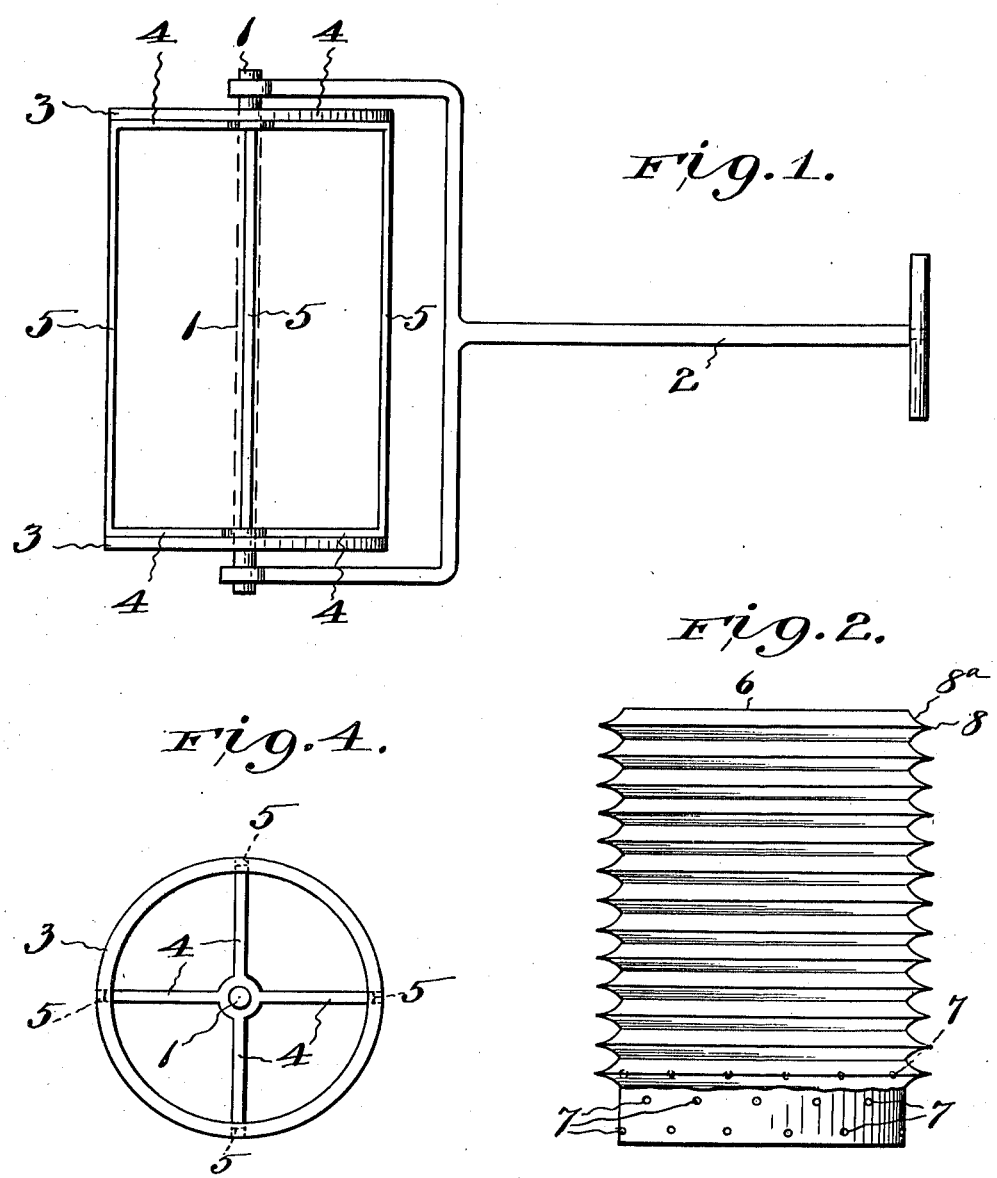

M. J. MALLOY.
IMPLEMENT FOR CORRUGATING PLASTIC STREET COVERINGS.
APPLICATION FILED FEB. 14, 1911.
993,086.
Patented May 23, 1911.
2 SHEETS—SHEET 2.
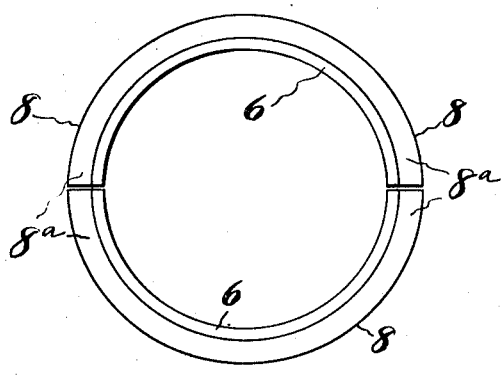
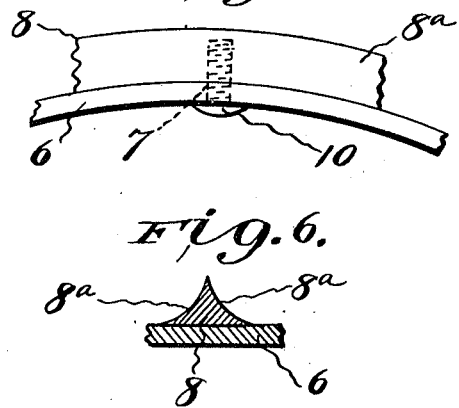
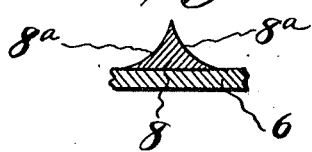
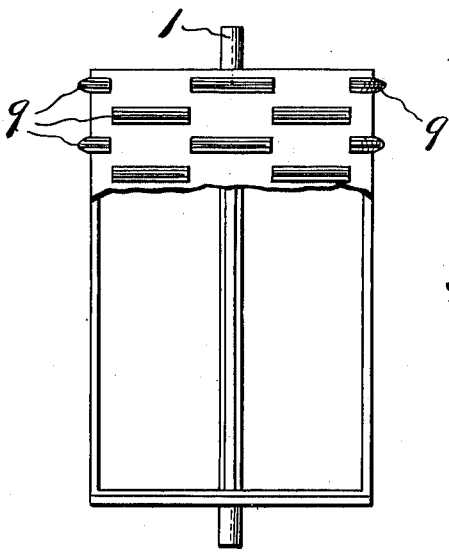
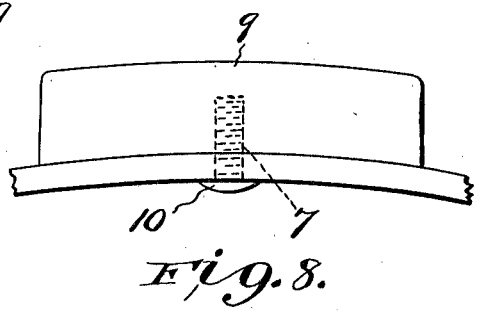
WITNESSES
INVENTOR:
Michael J. Malloy
by James K. Polk
Attorney

UNITED STATES PATENT OFFICE.

MICHAEL J. MALLOY, OF DAVENPORT, IOWA.

IMPLEMENT FOR CORRUGATING PLASTIC STREET-COVERINGS.

993,086.

Specification of Letters Patent. Patented May 23, 1911.

Application filed February 14, 1911. Serial No. 608,556.

*To all whom it may concern:*

Be it known that I, MICHAEL J. MALLOY, a citizen of the United States, and a resident of Davenport, in the county of Scott and State of Iowa, have invented certain new and useful Improvements in Implements for Corrugating Plastic Street-Coverings, of which the following is a specification.

My invention relates to devices for forming corrugations or grooves in street coverings, driveways, and the like, and has for its object the provision of a rolling tool having a removable cylindrical casing formed in semi-cylindrical segments to admit of removably and replaceably securing the casing in position, the casing being provided with a plurality of rows of bolt-holes to provide for removably securing tongues or beads thereto to form the depressions in the surface of the street covering.

My invention will be described in detail hereinafter and illustrated in the accompanying drawings, in which—

Figure 1 is a top plan view of my improved implement with the casing removed from the roller; Fig. 2, a top plan view of one of the semi-cylindrical segments of the casing partly broken away to show the casing before the corrugators are secured in position; Fig. 3, an end view of the semi-cylindrical casings with the corrugators in position; Fig. 4, a side view of Fig. 1, with the handle removed; Figs. 5, and 6, detail views on an enlarged scale of one of the corrugators shown in Figs. 2 and 3; Fig. 7, a view of the roller with the casing in position and another form of corrugator secured thereto; and Figs. 8 and 9, detail views of the form of corrugator shown in Fig. 7.

In the drawings similar reference characters will be used to designate corresponding parts throughout all of the views.

1 indicates a shaft, to the ends of which are secured the two ends of a forked handle 2 for operating the implement and having a roller-frame consisting of rings 3, cross-bars 4, and longitudinal bars 5 secured thereto.

The casing of the roller that is secured to the roller-frame, above referred to, consists of two semi-cylindrical segmental plates 6, of any suitable material, that are secured together in any suitable manner (not shown) and provided with a plurality of rows of bolt-holes 7 in parallel rows around the segments.

8 in Figs. 2, 5 and 6 indicates one form of what I denominate a "corrugator", consisting of a bead or tongue substantially triangular in cross-section, as shown in Fig. 6, with its sides formed concave, as shown at 8ª. These corrugators may be formed equal in length to the periphery of the segment to which they may be secured, or may be formed of any length desired.

In Figs. 7, 8, and 9 are shown corrugators 9 that are relatively short and triangular in cross-section, but with their outer edges formed convex, as shown, so that when in operation the street covering will be formed with a plurality of interrupted depressions or grooves, the corrugators being so placed on the casing segments that the corrugators of alternate rows are alined with one another and with the spaces between the corrugators in the intermediate rows. 10 indicates threaded bolts secured to the corrugators 8 and 9 through holes 7 in the segments to hold them in position.

Having thus described my invention, what I claim is—

1. An impression implement comprising a rotatable frame, a casing consisting of two semicylindrical segmental plates removably secured to said frame, and impression devices secured to said casing, substantially as shown and described.

2. An impression implement comprising a shaft, a forked handle secured to the shaft, by the two ends of the fork prongs, a rotatable frame comprising rings, cross-bars secured to the rings, and longitudinal bars connecting the rings, said frame being journaled on the shaft aforesaid, a casing secured to said frame comprising two semi-cylindrical segmental plates having a plurality of holes therein and removably secured to said rotatable frame, and impression devices secured to the outer surface of said casing by means of securing members engaging the holes in the casing, substantially as shown and described.

In witness whereof, I have hereunto set my hand in presence of two subscribing witnesses.

MICHAEL J. MALLOY.

Witnesses:
A. E. CARROLL,
E. J. CARROLL.